US 6,543,814 B2

(12) United States Patent
Bartholomew

(10) Patent No.: US 6,543,814 B2
(45) Date of Patent: Apr. 8, 2003

(54) QUICK CONNECTOR

(76) Inventor: John M. Bartholomew, 5771 McKinley Rd., China Township, MI (US) 48054

( * ) Notice: Subject to any disclaimer, the term of this patent is extended or adjusted under 35 U.S.C. 154(b) by 0 days.

(21) Appl. No.: 09/927,048

(22) Filed: Aug. 9, 2001

(65) Prior Publication Data
US 2002/0019177 A1 Feb. 14, 2002

Related U.S. Application Data
(60) Provisional application No. 60/224,316, filed on Aug. 10, 2000.

(51) Int. Cl.⁷ ............................................. F16L 39/00
(52) U.S. Cl. ....................................................... 285/319
(58) Field of Search ......................................... 285/319

(56) References Cited

U.S. PATENT DOCUMENTS

| 2,262,585 A | 11/1941 | Irmischer |
| 2,295,830 A | 9/1942 | Carlson |
| 2,318,220 A | 5/1943 | Haselwood |
| 2,467,370 A | 4/1949 | Christensen |
| 2,521,127 A | 9/1950 | Price |
| 2,538,683 A | 1/1951 | Guiler et al. |
| 2,667,184 A | 1/1954 | Hailer et al. |
| 3,341,227 A | 9/1967 | Pierce, Jr. |
| 3,439,944 A | 4/1969 | Leutenegger |
| 3,603,621 A | 9/1971 | Parsons |
| 3,756,632 A | 9/1973 | Riggs et al. |
| 3,826,523 A | 7/1974 | Eschbauch |
| 3,841,671 A | 10/1974 | Walker |
| 3,950,016 A | 4/1976 | Worley |
| 4,008,910 A | 2/1977 | Roche |
| 4,105,226 A | 8/1978 | Frey et al. |
| 4,243,254 A | 1/1981 | Hill et al. |
| 4,266,814 A | 5/1981 | Gallagher |
| 4,423,892 A | 1/1984 | Bartholomew |
| 4,524,995 A | 6/1985 | Bartholomew |
| 4,526,411 A | 7/1985 | Bartholomew |
| 4,541,658 A | 9/1985 | Bartholomew |
| 4,566,168 A | 1/1986 | Stromberg |
| 4,568,111 A | 2/1986 | Christiansen et al. |
| 4,573,716 A | 3/1986 | Guest |
| 4,593,943 A | 6/1986 | Hama et al. |
| 4,596,272 A | 6/1986 | Medvick et al. |
| 4,601,497 A | 7/1986 | Bartholomew |
| 4,610,468 A | 9/1986 | Wood |
| 4,637,640 A | 1/1987 | Fournier et al. |
| 4,643,466 A | 2/1987 | Conner et al. |
| 4,669,757 A | 6/1987 | Bartholomew |
| 4,681,351 A | 7/1987 | Bartholomew |
| 4,697,832 A | 10/1987 | Dickirson |

(List continued on next page.)

FOREIGN PATENT DOCUMENTS

| DE | 26 22 269 | 11/1977 |
| FR | 1391023 | 1/1965 |
| GB | 1197512 | 7/1970 |
| WO | WO 97/12170 | 4/1997 |

Primary Examiner—Lynne H. Browne
Assistant Examiner—James M. Hewitt
(74) Attorney, Agent, or Firm—Harness, Dickey & Pierce, PLC

(57) ABSTRACT

A swivelable, releasable quick connector is disclosed. The interconnection includes a female element which receives a male element or tube, and an elastomer sealing ring to create a fluid tight seal therebetween. Furthermore, a locking mechanism is included to releasably lock the male element within the female element. The locking mechanism comprises a one-piece stamped metal retainer that may be preassembled on either the male or female element and which includes manually engageable portions that may be biased toward one another to effect the release of the retainer from the female element and thereby permit the male element to be disconnected from the female element.

16 Claims, 4 Drawing Sheets

U.S. PATENT DOCUMENTS

| | | |
|---|---|---|
| 4,721,331 A | 1/1988 | Lemelshtrich |
| 4,749,214 A | 6/1988 | Hoskins et al. |
| 4,750,765 A | 6/1988 | Cassidy et al. |
| 4,753,458 A * | 6/1988 | Case et al. .................. 285/319 |
| 4,778,203 A | 10/1988 | Bartholomew |
| 4,810,009 A | 3/1989 | Legris |
| 4,811,975 A | 3/1989 | Paul, Jr. et al. |
| 4,828,297 A | 5/1989 | Tarum |
| 4,832,378 A | 5/1989 | Zepp |
| 4,842,308 A | 6/1989 | Spotts |
| 4,842,309 A | 6/1989 | LaVene et al. |
| 4,844,515 A | 7/1989 | Field |
| 4,850,622 A | 7/1989 | Suzuki |
| 4,867,484 A | 9/1989 | Guest |
| 4,875,709 A | 10/1989 | Caroll et al. |
| 4,902,043 A | 2/1990 | Zillig et al. |
| 4,915,136 A | 4/1990 | Bartholomew |
| 4,936,544 A | 6/1990 | Bartholomew |
| 4,943,091 A | 7/1990 | Bartholomew |
| 4,946,205 A | 8/1990 | Washizu |
| 4,948,175 A | 8/1990 | Bartholomew |
| 4,948,176 A | 8/1990 | Bartholomew |
| 4,948,180 A | 8/1990 | Usui et al. |
| 4,969,669 A | 11/1990 | Sauer |
| 4,979,765 A | 12/1990 | Bartholomew |
| 5,002,315 A | 3/1991 | Bartholomew |
| 5,009,454 A | 4/1991 | Bartholomew |
| 5,033,513 A | 7/1991 | Bartholomew |
| 5,067,754 A | 11/1991 | Bartholomew |
| 5,105,787 A | 4/1992 | Imoehl |
| 5,163,720 A | 11/1992 | Abe |
| 5,171,028 A | 12/1992 | Bartholomew |
| 5,178,424 A | 1/1993 | Klinger |
| 5,207,462 A | 5/1993 | Bartholomew |
| 5,209,523 A | 5/1993 | Godeau |
| 5,226,679 A | 7/1993 | Klinger |
| 5,275,448 A | 1/1994 | McNaughton et al. |
| 5,297,818 A | 3/1994 | Klinger |
| 5,303,963 A | 4/1994 | McNaughton et al. |
| 5,324,082 A * | 6/1994 | McNaughton et al. ...... 285/319 |
| 5,342,099 A | 8/1994 | Bahner et al. |
| 5,350,203 A | 9/1994 | McNaughton et al. |
| 5,368,274 A | 11/1994 | Falk et al. |
| 5,378,024 A | 1/1995 | Kumagai et al. |
| 5,395,140 A | 3/1995 | Wiethorn |
| 5,401,063 A | 3/1995 | Plosz |
| 5,425,556 A | 6/1995 | Szabo |
| 5,441,313 A | 8/1995 | Kalahasthy |
| 5,520,151 A | 5/1996 | Gras et al. |
| 5,551,732 A | 9/1996 | Bartholomew |
| 5,626,371 A * | 5/1997 | Bartholomew ............... 285/319 |
| 5,683,121 A | 11/1997 | Guest |
| 5,716,081 A | 2/1998 | Leigh-Monstevens et al. |
| 5,730,475 A * | 3/1998 | Kargula ....................... 285/308 |
| 5,732,984 A * | 3/1998 | Bartholomew ............... 285/319 |
| 5,735,555 A | 4/1998 | Answine et al. |
| 5,775,738 A | 7/1998 | Bartholomew |
| 5,794,984 A | 8/1998 | Bartholomew |
| 5,823,508 A | 10/1998 | Nie |
| 5,853,204 A | 12/1998 | Bartholomew |
| 5,897,145 A * | 4/1999 | Kondo et al. ................ 285/319 |
| 5,924,746 A | 7/1999 | Fixemer |
| 5,927,761 A | 7/1999 | Bartholomew |
| 5,931,509 A * | 8/1999 | Bartholomew ............... 285/319 |
| 6,062,607 A | 5/2000 | Bartholomew |
| 6,186,561 B1 * | 2/2001 | Kaishio et al. ............. 285/308 |
| 6,199,920 B1 * | 3/2001 | Neustadtl .................... 285/319 |
| 6,234,544 B1 | 5/2001 | Bartholomew |
| 6,250,692 B1 * | 6/2001 | Ito et al. ..................... 285/319 |
| 6,343,814 B1 * | 2/2002 | Bucher et al. .............. 285/319 |
| 6,349,978 B1 * | 2/2002 | McFarland et al. ......... 285/319 |
| 6,402,204 B1 * | 6/2002 | Stuart et al. ................ 285/308 |

* cited by examiner

QUICK CONNECTOR

This application claims the benefit of Provisional application Ser. No. 60/224,316, filed Aug. 10, 2000.

FIELD OF THE INVENTION

The present invention relates generally to a connector and more particularly to a connector assembly for providing a swivelable quick connection.

BACKGROUND OF THE INVENTION

Quick connector couplings, which are relied upon heavily on the automotive industry, generally consist of a male member, that is received by a female member, each of which are attached to separate fluid conduits. The two most difficult obstacles to overcome in creating such a connection are providing a fluid tight seal, and a simple method of connection. Prior methods of obtaining such a connection included threaded fittings, that would require tools to tighten, and very often retighten them on a regular basis, which demands down-time for the vehicle. From that starting point there is no other method of performing the identical tasks and still maintaining a novel concept.

There is also a risk involved of possibly over tightening the connector, which could damage the coupling causing possible leakage. Furthermore, they were comprised of multiple parts, that required inventory to be maintained to keep track of the parts. An additional drawback with the conventional type of fittings, is they were limited to being assembled from one direction alone. The attaching means was required to be affixed to either the male end or the female end, prior to connection, causing a potential problem in that the two ends may be difficult to align in the correct orientation while connecting the two members, possibly causing kinks in the fluid line which stresses the hose and shortens its life.

The need arose for a connector that can be fastened quickly, provide a fluid tight seal, and can be engaged manually form either direction, without any special tools. The use of a quick connector coupling is advantageous in that it can create a sealed, and secured connection between fluid lines, with minimal effort and expense.

SUMMARY OF THE INVENTION

Accordingly, it is the primary object of the present invention to provide an improved connector assembly for creating a swivelable quick connection between fluid conveying conduits.

In addition, it is an object of the present invention to provide a pre-assembled connector housing and retaining element so that a connection to a tubular fluid conveying conduit may be made in one step without requiring any tools.

Another object of the present invention is to provide a pre-assembled connector housing and retainer element so that a snapping connection may be made to a tubular fluid conveying conduit.

It is a further object of the present invention to provide a retainer that may be pre-assembled on the male or the female portion of the connector immediately prior to final assembly.

It is another object of the present invention to provide a pre-assembled connector conduit unit which requires only a one-step snapping connection to be joined to a connector housing.

It is also an object of the present invention to provide an improved retainer element which operates to both secure the male conduit in the bore of the housing and position the sealing element within the required location to prevent leakage It is a more specific object of the present invention to provide an improved retainer element formed with three or more leg members which operate to press tabs into annular recesses to secure the retainer element to the housing, and the conduit in its operative position within the axial bore of the housing.

To achieve the foregoing objects, the present invention provides a swivelable connector assembly which generally comprises a tubular conduit, a housing, sealing means, and retainer. The tubular conduit is adapted to convey fluid and is formed with an annular projection disposal a predetermined distance from the end of the conduit to be connected. The housing is formed with an axial bore for receiving the conduit at a first end and for providing a fluid path at a second end, and includes an outwardly extending annular recess (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular recess of the conduit to secure the conduit in its operable position within the axial bore of the housing. The retainer means is a one piece retainer element which includes at least two circumferentially spaced leg members which extend from an integral collar member at one end thereof. Each of the leg members has a deflectable leg portion which extends from the collar and ends in a semi-cylindrical portion including a tab to provide a backstop for securing the retainer element in the female housing, and at least two, generally parallel deflectable fingers, oriented perpendicular to the collar, for securing the retaining element to the male member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
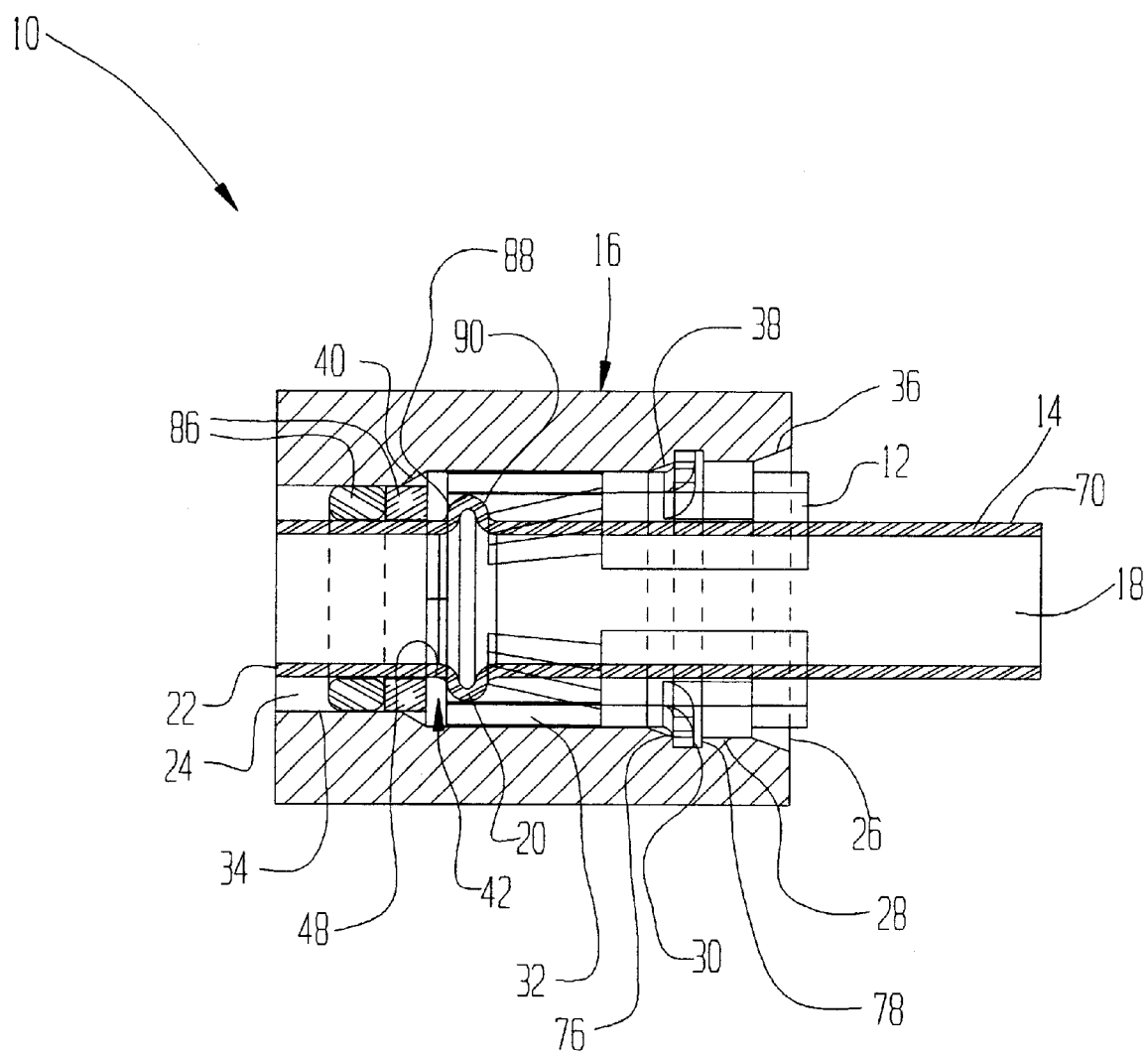
FIG. 1 is a cross-sectional view of the male portion inserted into the female portion showing the entire male portion.
Figure 2:
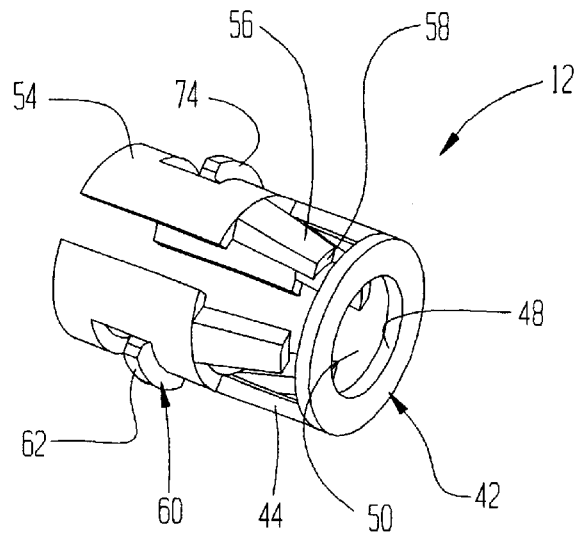
FIG. 2 is a perspective view of the retainer alone.
Figure 3:
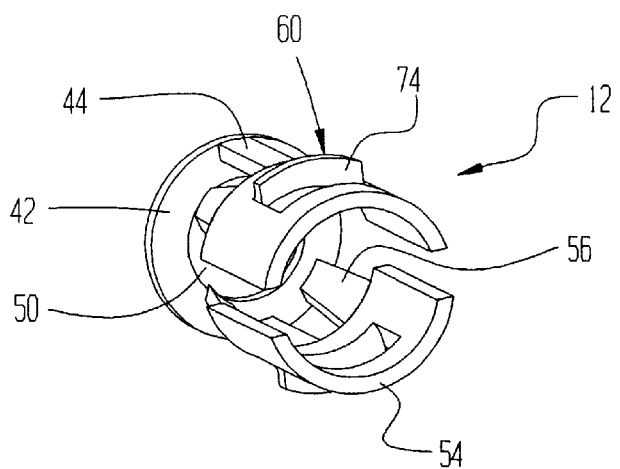
FIG. 3 is another perspective view of the retainer alone.

The following description of the preferred embodiment(s) is merely exemplary in nature and is in no way intended to limit the invention, its application, or uses. Referring to FIGS. 1, 2 and 3, a cross-sectional and two perspective views of a retaining element 12 of a quick connector fluid coupling 10, is shown, comprised of retaining element 12, male member 14, and female housing 16. The male member 14, is comprised of a conduit with a through bore 18, and an integrated annular flange or bead 20, located a specific distance from a terminal end 22. The female housing 16, comprised of through bore 24, receiving end 26, an internal bore portion 28, annular channel 30, and internal bore portions 32, and 34, for engaging with male member 14, and retaining element 12, when both are engaged with female housing 16. Receiving end 26, has chamfers 36, 38 and 40 for biasing leg members 44, of retaining element 12, and for simplifying alignment during assembly.

The retaining element 12, preferably a one piece, stamped metal construction, includes a collar portion 42, at least two or more deflectable leg members 44, which extend from the collar portion 42, with inside edge 48, defining passage 50, at one end thereof. Each of the deflectable leg members 44, extending parallel from and perpendicular to the collar portion 42, ends in a semi-cylindrical portion 54, including at least two, generally parallel, but radially inward bent, deflectable finger portions 56, projecting towards collar portion 42, having a terminal end 58, for abutting against annular bead 20, securing the retaining element 12, to the male member 14. The deflectable leg members 44 each further include a radially outward tab 60 having surface 62, aligned axially with deflectable leg members 44, adopted to be removeably received within the annular channel 30, formed in housing 16, when quick connector 10, is assembled.

Figure 4:
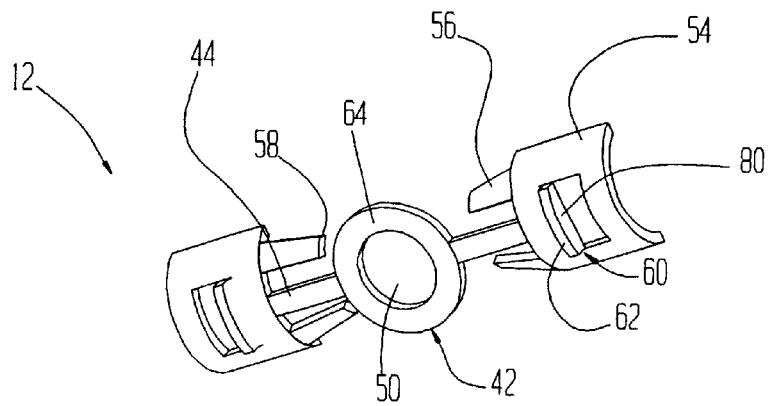
FIG. 4 is a perspective view of the retainer alone, as shown prior to the leg members being formed to their operative position generally perpendicular to the associated collar portion.
Figure 5:
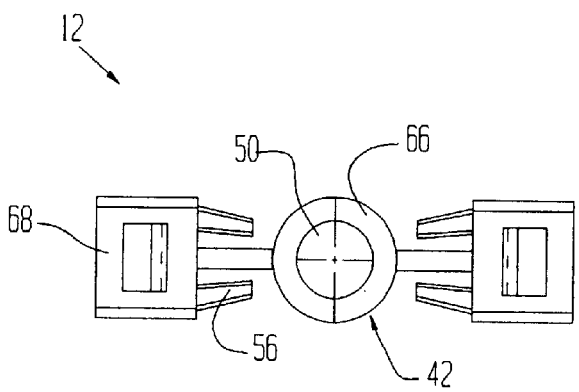
FIG. 5 is a plan view of the retainer of FIG. 4, from the front side.
Figure 6:
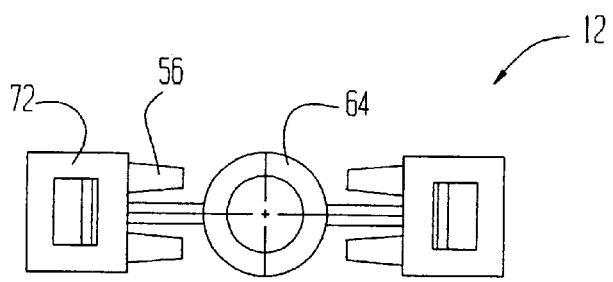
FIG. 6 is a plan view of the retainer of FIGS. 4 and 5, from the reverse side.
Figure 7:
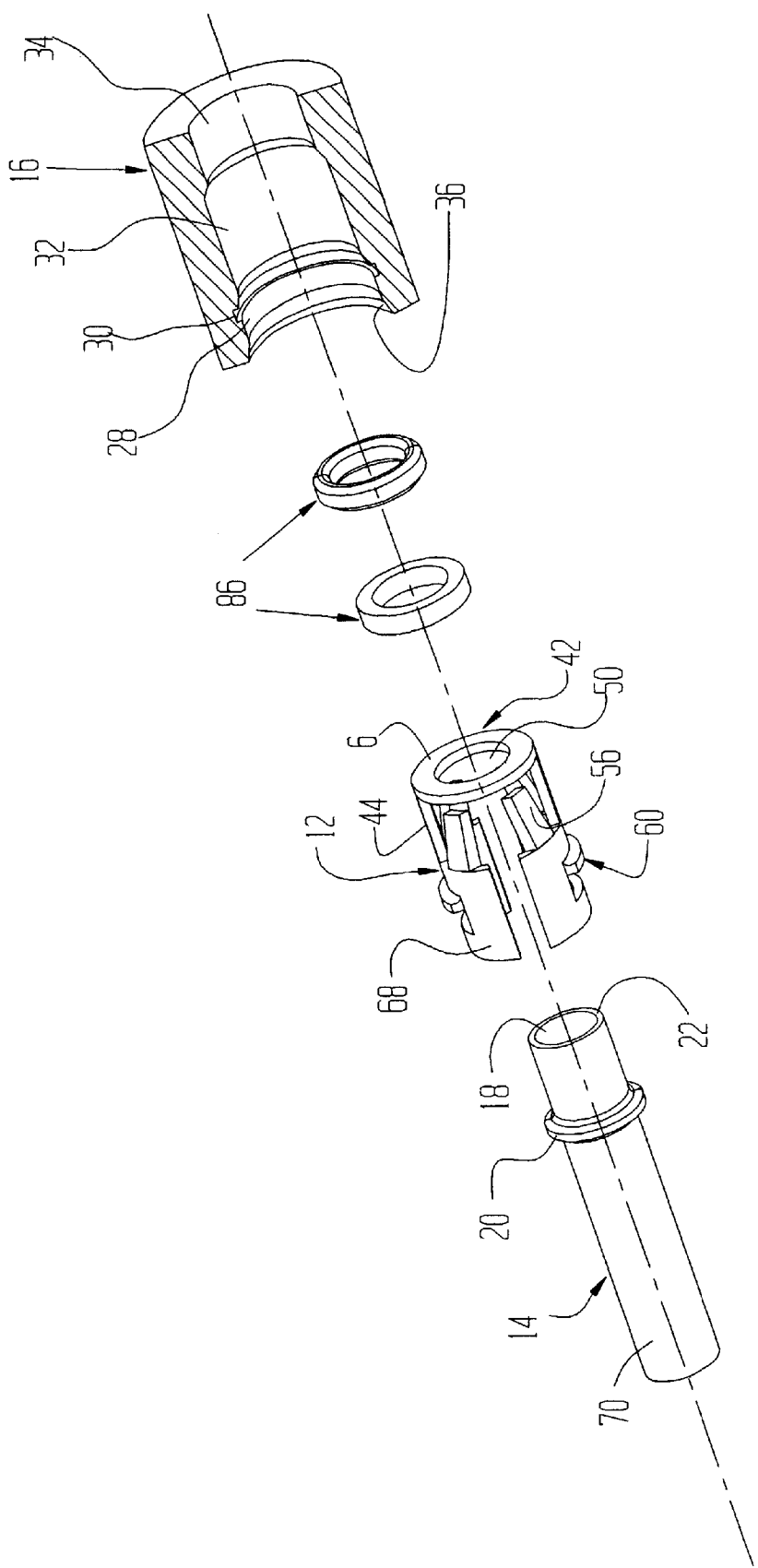
FIG. 7 is an exploded, partial sectional view of the male member, female member, retainer and sealing means.

FIGS. 4, 5 and 6, disclose a perspective, and two planar views, respectively, of the retaining element 12, and illustrate the equally spaced, deflectable, leg members 44, splayed out, i.e., prior to being formed into their operative positions shown in FIG. 3. The one piece design displays the collar portion 42, defining a passage 50, for inserting the terminal end 22, of the male member 14, having a first surface 64, for abutting a sealing means such as a resilient o-ring 86, (as seen in FIG. 7) and a second surface 66, for abutting the annular bead 20, on the male member 14. The semi-circular end portion 54, of the deflectable leg member 44, has a first surface 68, for abutting the curved outer surface 70, of the male member 14, and a second surface 72, for abutting the second bore surface 32, of the inside of the female housing 16, when engaged with the housing 16.

Referring to FIG. 7, an exploded, partial sectional view of the male member 14, the retaining element 12, the female housing 16, and the sealing means 86. During connection of the quick connector coupling, the retaining element may be pre-assembled onto either the male member 14, or into the receiving end of the female housing 16, prior to final connection. When the retaining element 12, is assembled with the female housing 16, the leg members 44, of the retaining element 12, deflect inward upon contact of the first edge 74, of the tab 60, (see FIG. 2) with the first chamfer radius 36, of the receiving end 26, of the female housing 16, until the point where surface 62, of tab 60, clears the bore 28, of the female housing 16. Further axial insertion of the retaining element 12, to the point where tab 16 clears bore 28, results in the deflectable leg members 44, reflecting radially outward to the point where the surface 62, of tab 60, is received within the annular channel 30, of the female housing 16. At this point, the retaining element 12, is fully engaged with the female housing 16, and further axial movement is prevented, because the first edge 74, of the tab 60 is abutted against the radial wall 76, of the female housing 16, and second edge 80, of tab 60, is abutted against radial wall 78, of female housing 16. (see FIG. 1)

When the retaining element 12, is connecting with the male member 14, either prior to or subsequently after assembly with female housing 16, the terminal end 22, passes between the deflectable leg members 44, of retaining element 12, and through the passage 50, of collar portion 42. Further insertion forces the radially inward bent finger portions 56, of the leg members 44, of the retaining element 12, to deflect outward upon contact with annular bead 20 of male member 14. Upon full insertion of the male member 14, into the retaining element 12, the finger portions 56, reflect inward radially once they clear the annular bead 20, of male member 14. At this point further axial movement between the male member 14, and the retaining element 12 is prevented because the second surface 66, of the collar portion 42, of the retaining element 12, is abutted against the first edge 88, of the annular flange 20, of the male member 14, and the terminal ends 58, of finger portions 56, of the retaining element 12, are abutted against the second edge 90, of the annular bead 20, of the male member 14, securing the connection, forming a unitary retainer element.

In the event it is desired to remove the male member 14 from the housing 16, it is merely necessary to manually bias the terminal ends 58, of the retaining element 12, towards one another, whereby the tabs 60 will move radially inwardly out of engagement with the annular channel 30, thus permitting the male member 14 and retaining element 12 to be withdrawn axially outwardly from the housing 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A quick connector assembly, comprising a male member, a female housing member, and a retaining element, the male member having a terminal end and an annular bead spaced apart from said terminal end, the female housing member having a first bore, a second bore, a third bore, and an annular channel, with a first chamfered radial wall formed between said annular channel and second bore and a second chamfered radial wall between said second and third bores, the male member being receivable within the female housing member, characterized in an improvement in the single piece retaining element comprising:

a body, said body having a collar portion;

a plurality of opposing, circumferentially spaced leg members each extending from said body, each of said leg members including:

a deflectable leg portion extending from said collar portion, ending in a semi-cylindrical portion;

a pair of spaced apart retaining fingers having a terminal end and extending generally axially towards said collar portion from said semi-cylindrical portion, said retaining fingers substantially parallel to said leg member, said retaining fingers angled radially inward towards the longitudinal axis of said body for engaging with said annular bead of said male member;

a locking tab extending radially outward from said semi-cylindrical portion, for engaging with said annular channel within said female housing member.

2. The quick connector assembly of claim 1, wherein said collar portion includes an aperture there-through for passage of the terminal end of the male member.

3. The quick connector assembly of claim 1, wherein said collar portion is positionable between the bead of the male member and said second radial wall of the female housing member.

4. The quick connector assembly of claim 1, wherein said leg members deflect inwardly as the retainer element is inserted into the female housing member.

5. The quick connector assembly of claim 1, wherein said locking tab of each said leg member engages with said annular channel on the inside of the female housing member.

6. The quick connector assembly of claim 1, wherein the retainer element can be pre-assembled onto one of the members prior to final assembly.

7. In a quick connector assembly, comprising a male member, a female housing member, with the male member having a terminal end and an annular bead spaced axially therefrom, and the female housing member having a first bore, a second bore, a third bore, and an annular channel, with a first chamfered radial wall formed between said annular channel and second bore and a second chamfered radial wall between said second and third bores, a one piece stamped metal retaining element for releaseably securing the terminal end of the male member within said bore of the female housing member, said retaining element adapted to be pre-assembled on one of the members and comprising a body having a collar portion;

a plurality of opposing, circumferentially spaced leg members each extending from said body, each of said leg members including:

a deflectable leg portion extending from said collar portion, ending in a semi-cylindrical portion; and a pair of spaced apart retaining fingers having a terminal end and extending generally axially towards said collar portion from said semi-cylindrical portion, said retaining fingers substantially parallel to said leg member, said retaining fingers angled radially inwards towards the longitudinal axis of said body for engaging with said annular bead of said male member a locking tab extending radially outward from said semi-cylindrical portion, for engaging with said annular channel within said female housing member, said locking tab directly aligned axially with said deflectable leg portion.

8. The quick connector assembly of claim 7, wherein said collar portion includes an aperture there-through for passage of the male member during assembly.

9. The quick connector assembly of claim 7, wherein said collar is positionable between the bead of the male member and said second radial wall of the female housing member.

10. The quick connector assembly of claim 7, wherein said leg members deflect inwardly as the retainer element is inserted into the female housing member.

11. The quick connector assembly of claim 7, wherein said locking tab of each said leg member engages with said annular channel on the inside of the female housing member.

12. The quick connector assembly of claim 7, wherein said plurality of leg members deflect inwardly upon assembly with said female housing member, until such point said collar of said retainer element abuts said second chamfered radial wall between said second bore and said third bore of said female housing member, at which point said leg members bend back.

13. The quick connector assembly of claim 7, wherein said locking tabs engage with said annular channel of said female housing member once said male member and said female housing member are fully assembled.

14. The quick connector assembly of claim 7, wherein said spaced apart retaining portions of said retainer element deflect on said bead on said male member during pre-assembly therewith.

15. The quick connector assembly of claim 7, wherein once connected, said male member and said female housing member can swivel independent of each other.

16. A quick connector assembly, comprising a male member, a female housing member, and a retaining element, the male member having a terminal end and an annular bead spaced apart from the end, the female housing member having a first bore, a second bore, a third bore, and an annular channel, with a first chamfered radial wall formed between said annular channel and second bore and a second chamfered radial wall between said second and third bores, the male member being receivable within the female housing member, characterized in an improvement in the single piece retaining element comprising:

a stamped metal body, said body having a collar portion;

a plurality of opposing, circumferentially spaced leg members each extending from said body, each of said leg members including:

a deflectable leg portion extending from said collar portion, ending in a semi-cylindrical portion;

a pair of spaced apart retaining fingers having a terminal end and extending generally axially towards said collar portion from said semi-cylindrical portion, said retaining fingers substantially parallel to said leg member, said retaining end angled radially inward towards the longitudinal axis of said body for engaging with said annular bead of said male member;

a locking tab extending radially outward from said semi-cylindrical portion, for engaging with said annular channel within said female housing member, said locking tab directly aligned axially with said deflectable leg portion.

* * * * *